United States Patent [19]
Clarke

[11] Patent Number: 5,986,557
[45] Date of Patent: Nov. 16, 1999

[54] THREE-PHASE FUSE STATUS INDICATOR

[75] Inventor: Roger S. Clarke, Lititz, Pa.

[73] Assignee: Automatic Timing & Controls, Inc., Lancaster, Pa.

[21] Appl. No.: 09/037,212

[22] Filed: Mar. 10, 1998

[51] Int. Cl.⁶ .................................................. G08B 21/00
[52] U.S. Cl. ........................ 340/638; 340/639; 361/104
[58] Field of Search .................... 340/648, 662, 340/638, 639; 361/104, 626, 88, 91, 93

[56] References Cited

U.S. PATENT DOCUMENTS

| | | | |
|---|---|---|---|
| 2,317,030 | 4/1943 | Colvin | 177/311 |
| 3,866,196 | 2/1975 | Mann et al. | 340/250 |
| 4,281,322 | 7/1981 | Nasu et al. | 340/638 |
| 4,349,813 | 9/1982 | Ishibashi et al. | 340/638 |
| 4,351,014 | 9/1982 | Schofield, Jr. | 361/104 |
| 4,554,607 | 11/1985 | Mora | 361/104 |
| 4,635,045 | 1/1987 | Miller et al. | 340/638 |
| 4,691,197 | 9/1987 | Damiano et al. | 340/638 |
| 4,857,896 | 8/1989 | Brooks | 340/639 |
| 4,969,063 | 11/1990 | Scott et al. | 361/93 |
| 5,175,528 | 12/1992 | Choi et al. | 340/331 |
| 5,343,192 | 8/1994 | Yenisey | 340/639 |
| 5,378,931 | 1/1995 | Bolda et al. | 361/104 |
| 5,510,773 | 4/1996 | Rodgers | 340/638 |
| 5,534,768 | 7/1996 | Chavannes et al. | 323/267 |
| 5,614,888 | 3/1997 | Borchmann et al. | 340/638 |
| 5,659,283 | 8/1997 | Arratia | 337/206 |

OTHER PUBLICATIONS

U.S. Statutory Invention Registration No. H248 to Middlebrooks on Apr. 7, 1987.

*Primary Examiner*—Daniel J. Wu
*Assistant Examiner*—Van T. Trieu
*Attorney, Agent, or Firm*—Fay, Sharpe, Fagan, Minnich & Mckee

[57] ABSTRACT

There is disclosed a multi-phase fuse status indicator having a green "good" and a red "bad" indicator LED for each line fuse of the respective phases, the current to the LED's being pulsed to cause them to provide a blinking indication. Power used for the logic circuit for the LED's and the LED's themselves and the related heat dissipation is less than 10 watts and is supplied from the power lines connected through the fuses regardless of the fuses' condition. Only two simple conductor connections are required from the fuse status indicator to each fused line of the multi-phase power system.

14 Claims, 4 Drawing Sheets

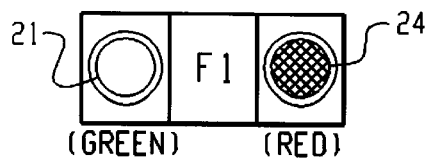 NORMAL
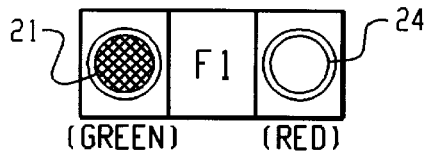 FUSE-LOAD FAULT
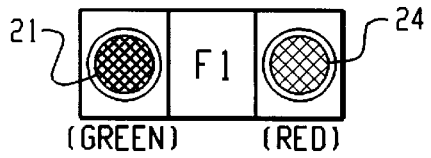 LINESIDE FAULT
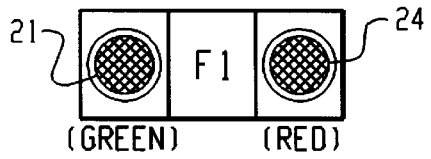 PHASE VOLTAGE FAULT
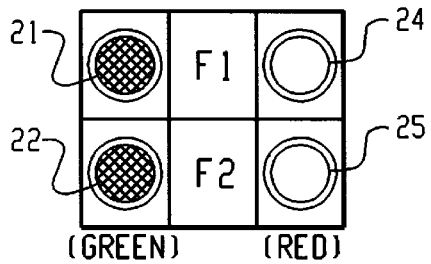 DOUBLE FAULT
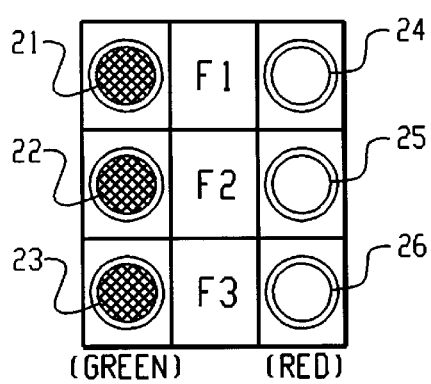 MULTIPLE FAULT

THREE-PHASE FUSE STATUS INDICATOR

TECHNICAL FIELD

The invention relates to devices indicating the status of a fuse or circuit breaker and providing a visual indication thereof, particularly such devices for use in multi-phase electrical systems.

BACKGROUND OF THE INVENTION

Fuse status indicators have long been known including fuse status indicators for multi-phase electrical systems commonly used to power heavy equipment in industrial applications. Often such indicators utilized a neon lamp or other lamp associated with each fuse which would illuminate when the fuse was blown or other malfunction failed to provide an electrical connection for one of the lines of the three-phase or multi-phase system to the load.

Frequently, such prior fuse status indicators included one or more push button switches for testing the indicator light; otherwise there might be a blown fuse or other fault which would go undetected. Recently, more complicated fuse status indicator circuits utilizing LED indicator lights rather than neon lamps have been employed but they also have generally produced only a "fuse bad" indication and if the fuse status indicator itself was defective then a blown fuse or other fault might go undetected.

Examples of such prior fuse status indicator circuits are shown in U.S. Pat. No. 4,857,896 to Brooks, dated Aug. 15, 1989; U.S. Pat. No. 5,343,192 to Yenisey, dated Aug. 30, 1994; and Statutory Registration No. H248 to Middlebrooks, published Apr. 7, 1987.

Other low voltage electrical systems have sought to provide fuse status indicators for multiple DC loads and their associated fuses which would indicate a particular blown fuse or other fault by failure of the associated LED to be illuminated upon closing a test switch. Such a system is shown in U.S. Pat. No. 4,281,322 to Nasu et al., issued Jul. 28, 1981. This circuit is clearly not adaptable for use in a high-voltage AC multi-phase power system.

SUMMARY OF THE INVENTION

The present invention provides a fuse status indicator for multi-phase electrical power circuits which includes substantially identical sub-circuits for each of the three or more phases of the power system, and hence for each of the line fuses (or circuit breakers) of the system. It will be understood that the term "fuse" as used herein includes any low-current responsive line interrupters, such as circuit breakers, magnetic or thermally operated disconnects or the like.

The fuse status indicator of the invention utilizes low voltage indicator lights, such as LED's, which are nevertheless very bright. Power consumption and internal heating in the device is further reduced by pulsing the indicator lights with a low duty cycle current at an attention attracting frequency of two flashes per second, for example. Novel current limiting and voltage regulating circuitry permits the logic circuitry and LED's with their 3–5 volt voltage requirement to be reliably operated over wide ranges of line voltages in power systems. At the same time, the fuse status indicator is sensitive to relatively low voltage (approximately 10–15 VAC) across an open fuse thereby assuring fault detection in cases where an indicator such as a high voltage neon lamp would be ineffective. The power consumption in the fuse indicator is approximately 7 VAC maximum (for high line voltage, e.g. 600 VAC phase-to-phase). This is important to reduce heat generation in the device and improve reliability.

A very important feature of the fuse status indicator according to the invention is that in nearly all cases for each phase there will be a flashing lamp indication which will be green for a normal condition and red for a fault condition. Thus, it is unnecessary to test for lamp or LED circuit failure with a push-button test switch because either absence of a flashing green light or presence of a flashing red light (or both) represents a fault indication.

In a three-phase system, the fuse status indicator requires only six connecting wires, three at the line side of the fuse and three at the load side of the fuse. The installation is simple and essentially foolproof and no additional power source is required since the power consumed is received from the three-phase power line. dr

BRIEF DESCRIPTION OF THE DRAWINGS

FIGS. 6–11 are illustrations of display conditions of the display panel shown in FIG. 1 for various normal or fault conditions that may be encountered.

DETAILED DESCRIPTION OF THE PREFERRED EMBODIMENTS

Figure 1:
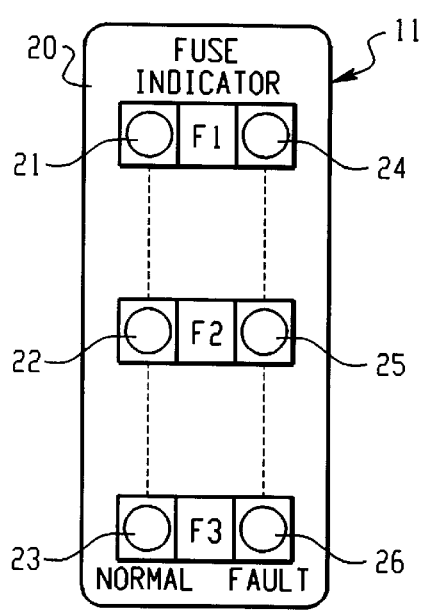
FIG. 1 is a front elevational view of the fuse status indicator showing the display panel thereof.
Figure 2:
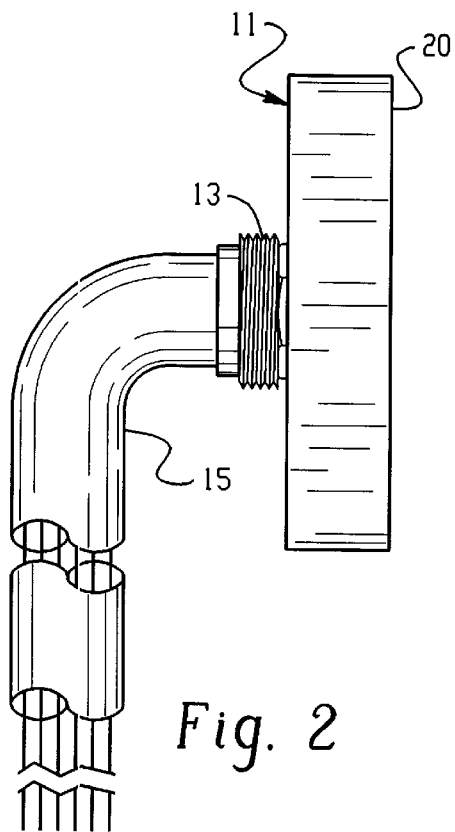
FIG. 2 is side elevational view of the fuse status indicator of FIG. 1.

Referring to the drawings, and particularly to FIGS. 1 and 2, a fuse status indicator 11 is shown having a display panel 20 which has visibly arranged LED's 21–26 appropriately labelled to show normal or fault conditions for each of the three lines of the three-phase power supply. LED's 21, 22, and 23 are green LED's serving as indicators for normal condition for lines 1, 2, and 3 respectively of the three-phase power supply. LED's 24, 25, and 26 are red LED's for indicating a fault condition in a respective one of the three lines of the three-phase power supply.

A connector 13 on the back of fuse status indicator 11 accommodates a six conductor cable 15 with suitable high voltage insulated conductors for connection to a fuse box and the load and line terminals therewithin.

Figure 3:
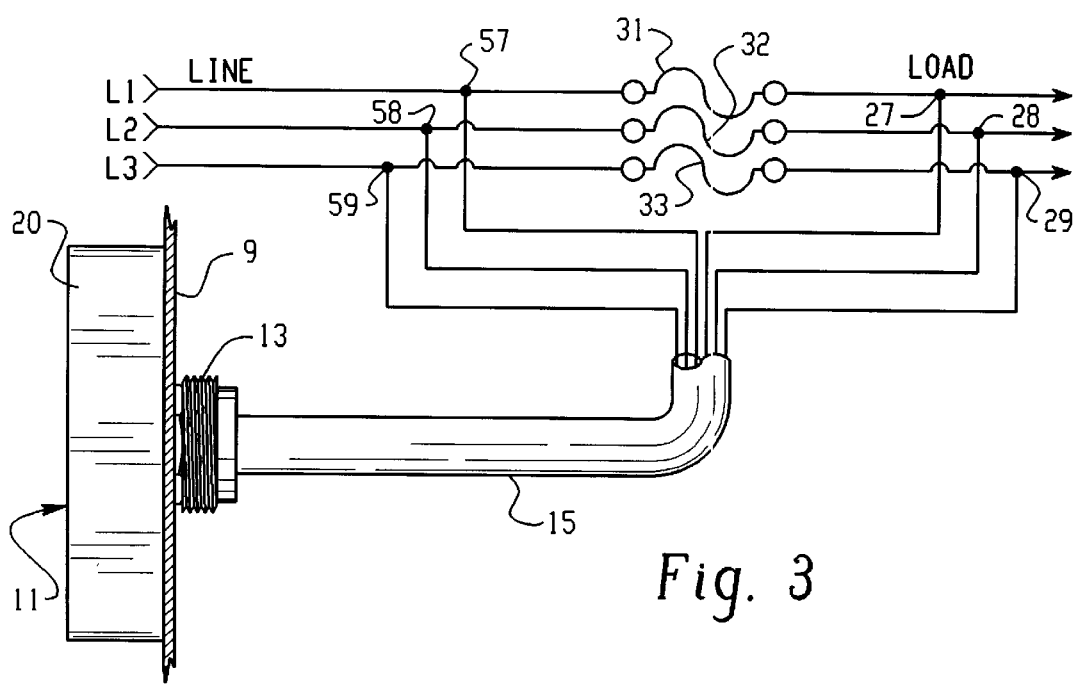
FIG. 3 is a schematic circuit diagram showing the connection of the fuse status indicator of FIGS. 1 and 2 with respect to the three fuses of a three-phase power line.

FIG. 3 shows a simplified circuit diagram wherein the fuse status indicator 11 is connected by cable 15 to line side terminals 57, 58 and 59 and to load side terminals 27, 28, and 29. Terminals 57 and 27 are bridged by fuse 31; terminals 58 and 28 are bridged by fuse 32; and terminals 59 and 29 are bridged by fuse 33. Fuse status indicator 11 may be mounted on a wall 9 of a fuse box or may be mounted remotely therefrom.

Figure 4:
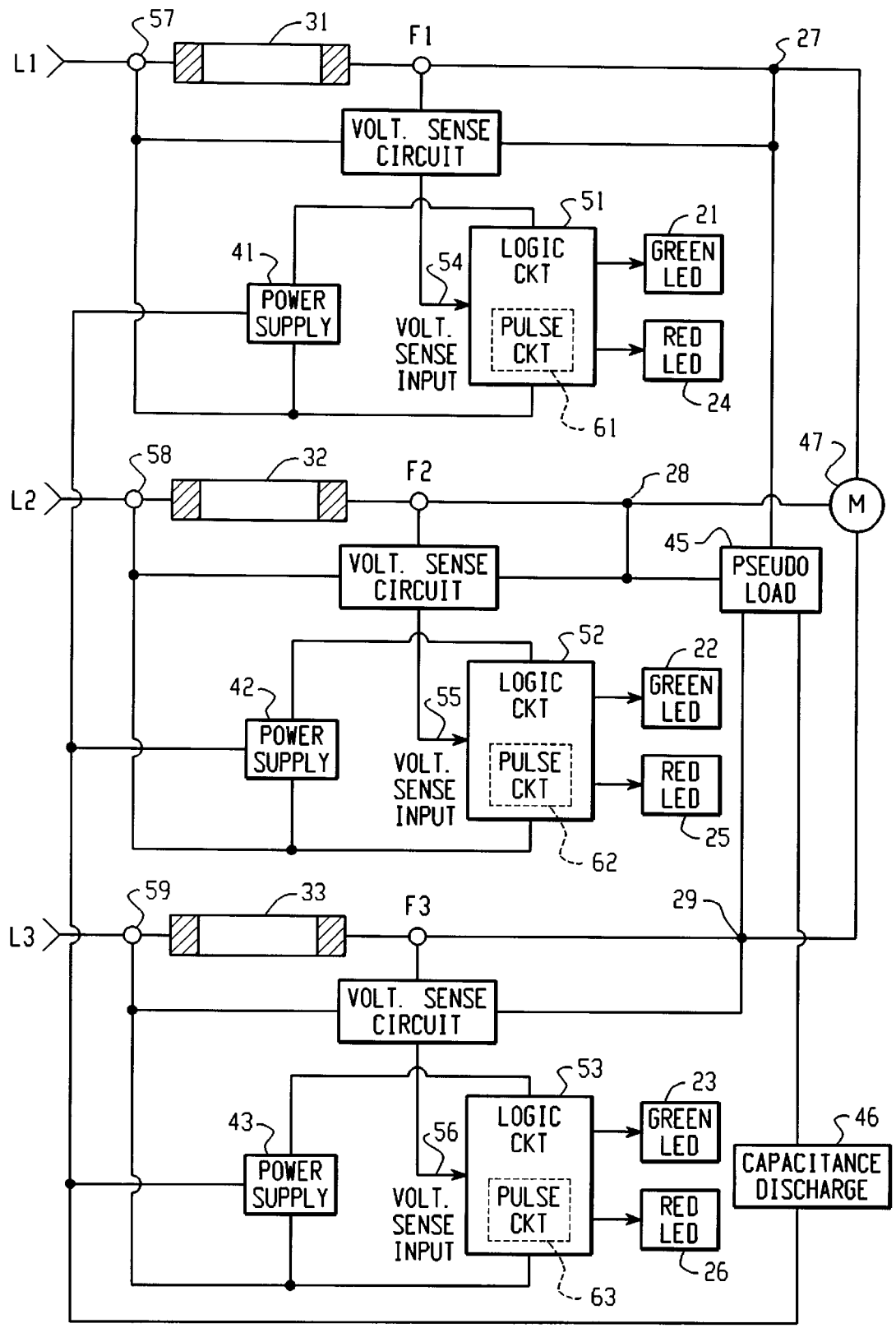
FIG. 4 is a block diagram of the circuitry of the fuse status indicator of FIGS. 1–3 useful in explaining the operation thereof.

FIG. 4 is a block diagram useful in explaining the structure and function of the electrical circuits including integrated circuits and discrete circuit elements comprising the three phase fuse status indicator. Indicated at L1, L2, and L3 are the line inputs from a conventional three phase power source which, for the purposes of this explanation, will be considered to have a voltage in the range of 208–600 VAC phase-to-phase (50/60 Hz), for example a nominal voltage of 400 volts. The apparatus of the invention is capable of operating with power systems of substantially higher voltage or substantially lower voltage while maintaining the advantages of low threshold voltage sensing, low power consumption, and low heat generation.

Power from the three phase power line connections L1, L2, and L3 is conducted through respective fuses 31, 32, and 33 to an electric motor 47 or other three phase energy consuming load.

A pseudo-load 45 is connected with a three phase connection to terminals F1, F2, and F3, situated at the load end of respective fuses 31, 32, and 33. An output from pseudo-load 45 is connected to a capacitance discharge circuit 46 and from thence to an input of each of power supplies 41, 42, and 43. As will later be more fully explained, this arrangement provides power for the logic circuits and the indicators in all required situations without the need for an independent power source, such as a battery.

Using line L1 as an example, it will be noted that power supply 41 has an independent ground or negative conductor electrically connected to a terminal 57 on the line side of fuse 31. The same arrangement exists for power supply 42 and terminal 58 and for power supply 43 and terminal 59. Each of the lines L1, L2 and L3 of the three phase power supply has a respective logic circuit 51, 52, and 53 associated therewith. Logic circuit 51 is powered by power supply 41; logic circuit 52 is powered by power supply 42; and, logic circuit 53 is powered by power supply 43.

Each of the logic circuits 51, 52, and 53 includes a pulse circuit 61, 62, and 63, respectively, so that output of the logic circuits 51, 52, and 53 to indicators 21, 22, 23, and 24, 25, 26 is not in the form of a continuous current, but is, rather, in the form of a pulse with a low-duty cycle, thereby reducing power consumption and reducing heat buildup in the circuits.

As previously explained, green LED's 21, 22, and 23 are used to indicate normal function for each of the three phases while red LED's 24, 25, and 26 are indicators of abnormal function with respect to one or more phases. While the function of the apparatus illustrated in FIG. 4 could be accomplished by various known circuit techniques, there are advantages of economy and efficiency associated with the preferred circuitry utilized, as illustrated in FIG. 5.

Figure 5:
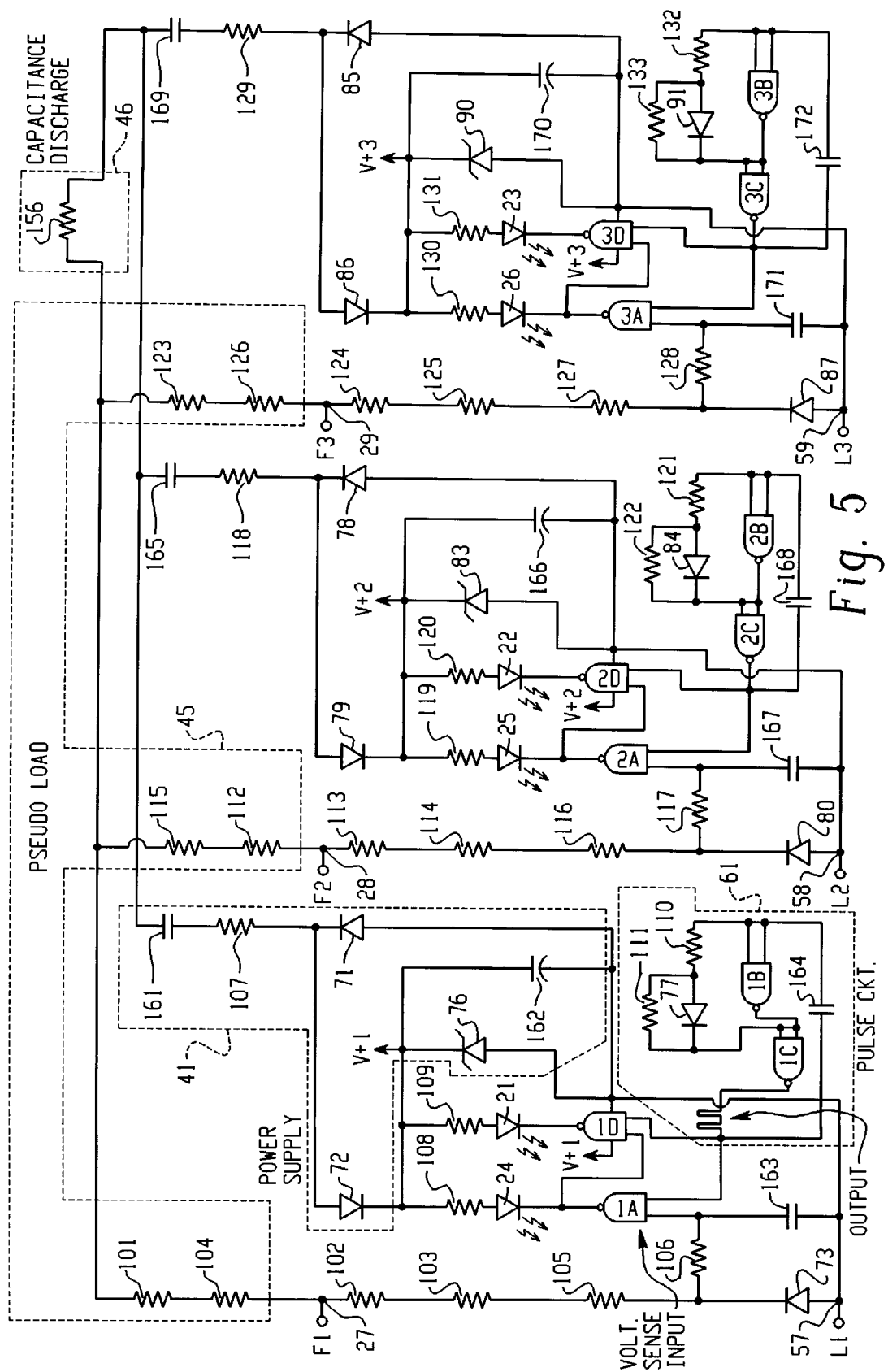
FIG. 5 is a detailed circuit diagram showing a preferred embodiment of circuitry for the fuse status indicator of FIGS. 1–4.

FIG. 5 shows circuit details corresponding to the explanatory block diagram of FIG. 4. It will be noted that the circuit shown in FIG. 5 comprises three substantially identical sub-circuits, each one having inputs and outputs relating to a particular one of the three phases. Although the operation of each of the sub-circuits will, at times, be affected by current or voltage signals of the other phase or phases, it is convenient to describe in detail just one of the sub-circuits, namely that associated with L1 or phase one, and input terminals 57 and 27. It should be noted that fuses 31, 32, and 33 and motor 47 shown in FIG. 4 are not shown in FIG. 5 because they are not part of the fuse status indicator circuit. The fuse for phase one would be electrically connected between line 1 input L1 and line 1 fuse load terminal F1. Fuses for the other three phase lines would be connected in a similar manner between L2 and F2 and between L3 and F3. Terminals 28 and 29 for lines 2 and 3 correspond to terminal 27 for line 1 and terminals 58 and 59 for lines 2 and 3 correspond to terminal 57 for line 1. A voltage sense input for the line 1 fuse 31 may be seen in FIG. 5 at terminals 27 and 57 connected to the F1 terminal at the load end of fuse 31 and the L-1 terminal at the line end of fuse 31. Diode 73, diode 80, and diode 87 perform half-wave rectification and capacitors 163, 167, and 171 provide a filtering or voltage holding function to convert a voltage sense input to D.C. voltage at PIN 1 of the quad-NAND integrated circuit chips which include NAND logic elements 1A through 1D, 2A through 2D, and 3A through 3D.

Capacitors 163, 167, and 171 are charged through respective resistors 106, 117, and 128 and the junction between each capacitor and its corresponding resistor is connected to pin 1 of NAND element 1A, 2A, or 3A respectively. NAND element 1A switches on red LED 24 whereas that function is performed for red LED 25 by NAND element 2A and for red LED 26 by NAND element 3A. The output from pulse circuit 61 is connected to pin 2 of NAND element 1A and there is a similar connection to pin 2 of NAND elements 2A and 3A.

Red LED 24 will come on when a high level is on pin 1 and also on pin 2 of NAND element 1A causing its output to go low. This is the well-known function of a NAND circuit element which has a high output at all times except when both input 1 and input 2 are high. It will be noted that LED 24 and also LED's 25 and 26 will not be on continuously in the presence of a voltage sense input, because the pulse circuit 61 (and corresponding circuitry for LED 25 and LED 26) produces a pulsed output with a low-duty cycle thereby causing a flashing indication from red LED 24 (and corresponding LED 25 and LED 26 for phases 2 and 3).

The operation of pulse circuit 61 and corresponding circuity for phases 2 and 3, is generally conventional except for the manner in which diode 77 produces the asymmetric pulse-wave form with low duty cycle and appropriate timing. Diodes 84 and 91 perform a similar function for phases 2 and 3. The NAND element 1C and the NAND element 2B are operated as inverters by connecting their two inputs together (and the same arrangement is used with NAND elements 2B and 2C and with NAND elements 3B and 3C). Capacitors 164, 168, and 172 provide feedback for the pulse oscillators while the arrangement of resistor 111 with resistor 110 (also resistor 122 with resistor 121 and resistor 133 with resistor 132) causes different effective resistance paths in a respective circuit for different directions of current flow, thereby producing the desired asymmetric low-duty cycle pulse wave form.

The pseudo-load 45 in FIG. 5 is formed by resistors 101 and 104 in phase 1, resistors 115 and 112 in phase 2 and resistors 123 and 126 in phase 3. The pseudo-load assures operation of the phase status indicator circuit even if all load was disconnected (from terminals F1, F2 and F3). Capacitance discharge element 46 comprises resistor 156 allowing for slow discharge of power supply capacitors. This provides a safety factor to eliminate shock hazard after power has been cut off. Power supply 41 comprises the elements within the dashed lines and similar independent power supplies are present for phase 2 and phase 3. Power supply 41 will be described with the understanding that the phase 2 and phase 3 circuits operate in a similar manner.

Capacitor 161 is a current limiting capacitor and is connected to the center of the Y-connected pseudo-load circuit and, together with resistor 107, provides a limited value of current to power supply 41. This function is provided by capacitor 165 and resistor 118 for phase 2 and capacitor 169 and resistor 129 for phase 3.

The current in power supply 41 is rectified by diode 72 and voltage regulation is provided by zener diode 76. The positive voltage provided by power supply 41 is present at terminals V+1. Additional overvoltage protection is customarily built into the internal circuitry of the quad NAND chip. The positive voltage of power supply 41 is also provided to terminals of resistor 108 and resistor 109 in the output of the respective NAND elements 1A and 1D.

In phase 2 and phase 3 the function of diode 72 is provided by diode 79 and diode 86; of diode 71 is provided by diode 78 and diode 85; of zener diode 76 is provided by zener diode 83 and zener diode 90; of positive terminals V+1 is provided by terminals V+2 and V+3; of resistor 108 is provided by resistor 119 and resistor 130; and of resistor 109 is provided by resistor 120 and resistor 131. Capacitor 162 (and capacitors 166 and 170) serve to reduce voltage fluctuations for the respective indicator circuits.

The function of the green LED's 21, 22, and 23 are provided in the following fashion. As previously seen with NAND element 1A and red LED 24, the operation of NAND element 1D will not permit LED 21 to be on except when both pins one and two are high. As previously seen, pin 2 will be high only during the pulse output from pulse circuit 61, whereas pin 1 will be high when the output of NAND element 1A is high (And red LED 24 is off.). Thus, the logic provided by the connection of NAND elements 1A and 1D (and also NAND elements 2A and 2D and NAND elements 3A and 3D) is such that green LED 21 (or 22, or 23) will be flashing on when, and only when, the corresponding red LED 24 (or 25 or 26) is off. That is to say, the green LED's will be on only when their respective voltage sense inputs do not detect a blown fuse or other fault.

Exemplary values for electronic components are given below in Table I and also shown in FIG. 5.

TABLE I

| REFERENCE NUMBER | VALUE | NOTE |
|---|---|---|
| 71 | 1N4007 | |
| 72 | 1N4007 | |
| 73 | 1N4007 | |
| 76 | 5.6 V | |
| 77 | 1N914 | |
| 78 | 1N4007 | |
| 79 | 1N4007 | |
| 80 | 1N4007 | |
| 83 | 5.6 V | |
| 84 | 1N914 | |
| 85 | 1N4007 | |
| 86 | 1N4007 | |
| 87 | 1N4007 | |
| 90 | 5.6 V | |
| 91 | 1N914 | |
| 101 | 470 k | 1/2 W |
| 102 | 470 k | 1/2 W |
| 103 | 470 k | 1 W MOR |
| 104 | 332 k | MFR |
| 105 | 332 k | MFR |
| 106 | 332 k | MFR |
| 107 | 10 k | 2 W MOR |
| 108 | 150 | |
| 109 | 150 | |
| 110 | 330 k | |
| 111 | 4.7 M | |
| 112 | 470 k | 1/2 W |
| 115 | 332 k | MFR |
| 117 | 332 k | MFR |
| 118 | 10 k | 2 W MOR |
| 119 | 150 | |
| 120 | 150 | |
| 121 | 330 k | |
| 122 | 4.7 M | |
| 123 | 470 k | 1/2 W |
| 124 | 470 k | 1/2 W |

TABLE I-continued

| REFERENCE NUMBER | VALUE | NOTE |
|---|---|---|
| 125 | 470 k | 1 W MOR |
| 126 | 32 k | MFR |
| 127 | 332 k | MFR |
| 128 | 332 k | MFR |
| 129 | 10 k | 2 W MOR |
| 130 | 150 | |
| 131 | 150 | |
| 132 | 330 k | |
| 133 | 4.7 M | |
| 156 | 10 M | 1/2 W |
| 161 | .047 µF | 630 V |
| 162 | 220 µF | 10 V |
| 163 | 1 µF | 50 V |
| 164 | .1 µF | 50 V |
| 165 | 047 µF | 630 V |
| 166 | 220 µF | 10 V |
| 167 | .1 µF | 50 V |
| 168 | 1 µF | 50 V |
| 169 | .047 µF | 630 V |
| 170 | 220 µF | |
| 171 | 1 µF | 50 V |
| 172 | .1 µF | 50 V |

FIGS. 6 through 11 illustrate the type of display present for various conditions of the system which the fuse status indicator monitors, as seen in FIG. 6, condition normal, fuse good, with good electrical contact across fuse for line 1. The same indication for the same condition would be given for line 2 or line 3, in this case green flashing LED. FIG. 7 shows an indication for fuse-load fault; namely the green LED dark and the red LED flashing. This is an indication of an unconnected or blown fuse, a bad connection on the load side, or both.

FIG. 8 shows the indication for a line side fault, namely a flashing red LED with reduced intensity. This indication can result from a bad connection on the line side of the fuse with or without a blown fuse; it may also indicate phase voltage loss with motor regeneration together with an unconnected or blown fuse.

FIG. 9 shows the indication of a phase voltage fault, namely both green and red LED's dark. This indication can result from a phase voltage loss with no motor regeneration with or without an unconnected or blown fuse. It is also an indication of a possible failure or malfunction within the fuse status indicator.

FIG. 10 shows the indication of a double fault, for example in lines 1 and 2, namely both red LED's flashing and green LED's dark. This indication can result from two unconnected or blown fuses, misconnected wires being interchanged on the line side or on the load side. Misconnected wires will produce this indication whether or not there are one or two unconnected or blown fuses.

FIG. 11 shows the indication of a multiple fault, namely all three LED's flashing. This indication can result from three unconnected or blown fuses, or where line side connections do not correspond to load side connections. When load side connections do not correspond to line side connections, this indication may result whether or not there are one or more unconnected or blown fuses.

It is important to note that all three lights flashing green is the only "normal" indication and a fault is indicated by presence of any red flashing lights or absence of any green flashing lights. Such fault indication will also be produced by a failure within the fuse status indicator itself, so that it may be replaced promptly.

While a preferred embodiment of the invention has been described in detail, it will be appreciated that many variations of the three-phase fuse status indicator may be employed according to the invention. For example, indicators other than LED's may be used, other logic circuitry may be used, and different integrated circuit components may be employed. The fuse status indicator could be adapted for use in multi-phase systems other than three-phase systems, if that were desired.

Variations and modifications to the invention, in addition to those shown, suggested or described herein, may be implemented by those skilled in the art and, accordingly, it is to be understood that the scope of the invention is not limited to those embodiments of the invention shown, described, or suggested but is rather to be determined by reference to the appended claims.

What is claimed is:

1. A multi-phase fuse status indicator for a multi-phase power system having line fuses, the indicator comprising:
   (a) a logic circuit for each phase of said power system, each of said logic circuits having a logic element connected to receive a voltage sense input from the respective line fuse associated with such logic element;
   (b) a non-isolated power supply connected to supply power to each said logic circuit with or without an electrical connection through any of said line fuses, said power supply containing a current-limiting capacitor with a capacitance of such value as thereby limits current to a value which is insufficient to power said logic circuit and a first or a second visual indicator and an energy accumulator capacitor which accumulates sufficient energy to flash the first or second visual indication;
   (c) a pulse generator circuit which receives power from the non-isolated power supply, the pulse generator intermittently enabling the logic circuit, causing accumulated energy in the energy accumulator capacitor to be discharged through and flash said first or said second visual indicator, said pulse generator circuit promoting reduced power consumption and reduced heat buildup in said fuse status indicator;
   (d) said first visual indicator being responsive to each said logic element to produce a first visual indication only in the presence of a voltage sense input thereto greater than a threshold level required to power said logic circuit, said first visual indication signifying a fault condition in said power system, such as a blown fuse; and
   (e) said second visual indicator being responsive to each said logic element to produce a second visual indication only in response to a voltage sense input thereto less than said threshold level required to power said logic circuit, said second visual indication signifying a normal operational condition in said power system.

2. The fuse status indicator as recited in claim 1 wherein each said logic element is a NAND logic element incorporated in an integrated circuit chip.

3. The fuse status indicator as recited in claim 1 wherein said non-isolated power supply includes a voltage regulator.

4. The fuse status indicator as recited in claim 1 wherein said first visual indicators comprise light emitting diodes of a first color and said second visual indicators comprise light emitting diodes of a second different color.

5. A multi-phase fuse status indicator for a multi-phase power system having line fuses comprising:
   a logic circuit for each phase of said power system, each of said logic circuits having a logic element connected to receive a sensed voltage input from the respective line fuse associated with such logic element;
   a non-isolated power supply connected to supply power to each said logic circuit without an electrical connection through any of said line fuses;
   a first visual indicator powered by said logic element to produce a first visual indication in the presence of a sensed voltage input thereto greater than a threshold level required, said first visual indication signifying a fault condition in said power system, such as a blown fuse;
   a second visual indicator being powered by said logic element to produce a second visual indication only in the presence of a sensed voltage input thereto less than said threshold level required, such second visual indication signifying a normal operational condition in said power system;
   a pulse generator circuit, each said logic element connected to receive the pulsed enable signals therefrom to cause said visual indicators to flash in synchronism with said pulse signals.

6. A multi-phase fuse status indicator for a multi-phase power system having line fuses, the indicator comprising:
   (a) a plurality of logic circuits, each such logic circuit being associated with one phase of said power system, each of said logic circuits having a logic element connected to receive a sensed voltage input from a corresponding line fuse;
   (b) a plurality of bypass circuits, each such bypass circuit allowing limited current flow around a respective one of said line fuses;
   (c) a multi-phase pseudo-load connected to receive current passing through said line fuses or said bypass circuits, said pseudo-load assuring that said multi-phase fuse status indicator operates in the event that all load is disconnected from said multi-phase fuse status indicator;
   (d) a plurality of non-isolated power supplies, each of said power supplies receiving power through said multi-phase pseudo-load and a capacitance discharge element, each of said power supplies connected to supply power to a respective one of said logic circuits with or without there being an electrical connection through any of said line fuses, each of said power supplies containing a current-limiting element which limits current around the fuse through the bypass circuit when the fuse blows;
   (e) a plurality of first visual indicators, each respectively responsive to a corresponding one of said logic circuits to produce a first visual indication only in the presence of a voltage greater than a threshold level sensed by said corresponding logic circuit, said first visual indication signifying a fault condition in said power system, such as a blown fuse; and
   (f) a plurality of second visual indicators, each respectively responsive to said corresponding logic element to produce a second visual indication only in the presence of a voltage less than said threshold level sensed by said corresponding logic circuit, said second visual indication signifying a normal operational condition in said power system;
   whereby said fuse status indicator gives a positive visual indication of a fault condition or normal condition.

7. The fuse status indicator as recited in claim 6 wherein each said logic circuit includes a pulse generator circuit and each said logic element is connected to receive pulse signals therefrom to cause said visual indicators to flash in synchronism with said pulse signals at a frequency which will attract attention to the status of each corresponding fuse.

8. The fuse status indicator as recited in claim 6 wherein each said logic element is a NAND logic element incorporated in an integrated circuit chip.

9. The fuse status indicator as recited in claim 6 wherein said first visual indicators comprise light emitting diodes of a first color and said second visual indicators comprise light emitting diodes of a second different color.

10. A multi-phase fuse status indicator for a multi-phase power system having line fuses, the fuse status indicator comprising:

(a) a plurality of fuses, one for each phase;

(b) a non-isolated power supply, a current-limiting circuit, and a pseudo-load connected in series across each fuse such that each phase has a dedicated power supply that operates even when the corresponding fuse blows, but allows only a minimal current to bypass a blown fuse;

(c) a voltage sensing circuit connected with each fuse to sense whether a voltage from each fuse is (i) above a threshold voltage indicative of a fuse fault condition or (ii) below the threshold voltage;

(d) a plurality of first visual indicators, each first visual indicator being powered to a light emitting state by a corresponding one of the voltage sensing circuits in response to the sensed voltage at the corresponding fuse being above the threshold voltage;

(e) a plurality of second visual indicators, each second visual indicator being powered to a light emitting state by a corresponding one of the voltage sensing circuits in response to the sensed voltage at the corresponding fuse being below the threshold voltage;

(f) a plurality of power reducing circuits, each power reducing circuit being powered by a corresponding one of the power supplies and controlling the corresponding first and second visual indicator, to operate intermittently on a reduced duty cycle.

11. The fuse status indicator as recited in claim 10 wherein each power reducing circuit includes a pulse generator circuit and each said voltage sensing circuit is connected to be gated by pulse signals therefrom to cause said visual indicators to flash in synchronism with said pulse signals.

12. The fuse status indicator as recited in claim 10 wherein each said voltage sensing circuit includes a NAND logic element incorporated in an integrated circuit chip.

13. The fuse status indicator as recited in claim 10 wherein each said power supply includes a voltage regulator.

14. The fuse status indicator as recited in claim 10 wherein said first visual indicators comprise light emitting diodes of a first color and said second visual indicators comprise light emitting diodes of a second different color.

* * * * *